United States Patent
Grabau (10) Patent No.: US 11,253,941 B2
(45) Date of Patent: Feb. 22, 2022

(54) PREDICTIVE ALGORITHM OF WELDING DISTORTION RESULTANT FROM ADDING FLANGES TO A BUTT WELD OR SOCKET WELD END OF VALVE BODY CASTING

(71) Applicant: FISHER CONTROLS INTERNATIONAL LLC, Marshalltown, IA (US)

(72) Inventor: Ted D. Grabau, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 379 days.

(21) Appl. No.: 15/585,978

(22) Filed: May 3, 2017

(65) Prior Publication Data

US 2017/0326668 A1    Nov. 16, 2017

Related U.S. Application Data

(60) Provisional application No. 62/334,245, filed on May 10, 2016.

(51) Int. Cl.
*B23K 9/12* (2006.01)
*B23K 9/095* (2006.01)
(Continued)

(52) U.S. Cl.
CPC ............ *B23K 9/0953* (2013.01); *B23K 9/048* (2013.01); *B23K 9/0956* (2013.01);
(Continued)

(58) Field of Classification Search
CPC ..... B22F 3/1055; B23K 26/342; B23K 9/048; B23K 9/0953; B23K 9/0956;
(Continued)

(56) References Cited

U.S. PATENT DOCUMENTS 2,227,542 A * 1/1941 Grove ................... F16K 27/102
251/362
3,975,810 A * 8/1976 Siepmann ............... B23P 13/00
29/890.129

(Continued)

FOREIGN PATENT DOCUMENTS

| CN | 101199994 A | 6/2008 |
| CN | 103252560 A | 8/2013 |

(Continued)

OTHER PUBLICATIONS

Dmg Mori, "LASERTEC-Baureihe LASERTEC Additive Manufacturing LASERTEC Shape," pp. 1-54, XP055394615, Retrieved from the Internet on Apr. 7, 2016: URL:https://de.dmgmori.com/blob/120822/5f353b51c5a5264006a8cb4c024628e1/p11de13-lasertec-baureihe-pdf-data.pdf—Retrieved on Jul. 28, 2017, pp. 6, 9-12, 16,48 and 49.

(Continued)

*Primary Examiner* — Sang Y Paik
(74) *Attorney, Agent, or Firm* — Marshall, Gerstein & Borun LLP (57) ABSTRACT

A method and apparatus are provided for late-customization of a valve body having an initial valve body configuration having a first end connection and a second end connection. The method includes receiving a selection of (i) a generic valve body, (ii) a first end connection, and (iii) a second end connection. The method further includes adjoining the first and second end connections to the valve body using an iterative welding process. The apparatus is configured to receive a generic valve body having an initial end configuration and to receive a different end configuration. Ends are connected to the valve body subject to an initial bias and a comparison between actual results and predicted results, and first end connection is iteratively welded.

20 Claims, 4 Drawing Sheets

(51) Int. Cl.
  *B23K 9/04* (2006.01)
  *B23K 26/342* (2014.01)
  *F01L 7/00* (2006.01)
  *B33Y 80/00* (2015.01)
  *F16K 27/10* (2006.01)
  *B33Y 50/00* (2015.01)
  *B23P 15/00* (2006.01)
  *B22F 10/20* (2021.01)

(52) U.S. Cl.
  CPC .......... *B23K 26/342* (2015.10); *B23P 15/001* (2013.01); *B33Y 50/00* (2014.12); *B33Y 80/00* (2014.12); *F01L 7/00* (2013.01); *F16K 27/10* (2013.01); *B22F 10/20* (2021.01); *Y02P 10/25* (2015.11)

(58) Field of Classification Search
  CPC ....... B23P 15/001; B33Y 50/00; B33Y 80/00; F01L 7/00; F16K 27/10; Y02P 10/295
  USPC ................. 219/125.1–125.12, 136–137 WM
  See application file for complete search history.

(56) References Cited

U.S. PATENT DOCUMENTS

| | | | | |
|---|---|---|---|---|
| 4,733,051 | A * | 3/1988 | Nadeau ................ | B23K 9/0956 219/124.34 |
| 4,857,693 | A | 8/1989 | Rump | |
| 5,233,150 | A * | 8/1993 | Schneebeli ............ | B23K 9/044 219/76.14 |
| 5,533,146 | A * | 7/1996 | Iwai ..................... | B23K 9/0956 219/121.63 |
| 2008/0230527 | A1* | 9/2008 | Cai ..................... | B23K 9/0026 219/137 R |
| 2009/0294426 | A1* | 12/2009 | Bong .................... | B23K 9/188 219/136 |
| 2014/0242400 | A1 | 8/2014 | Hoebel et al. | |
| 2015/0024233 | A1 | 1/2015 | Gunther | |
| 2015/0300179 | A1 | 10/2015 | Kamel et al. | |
| 2015/0331402 | A1 | 11/2015 | Lin et al. | |

FOREIGN PATENT DOCUMENTS

| | | |
|---|---|---|
| CN | 104295784 A | 1/2015 |
| DE | 102008012064 A1 | 9/2009 |
| RU | 2011006 C1 | 4/1994 |
| RU | 45169 U1 | 4/2005 |
| RU | 2253539 C1 | 6/2005 |
| RU | 66465 U1 | 9/2007 |
| RU | 2335681 C2 | 10/2008 |
| RU | 2407940 C2 | 12/2010 |
| RU | 152377 U1 | 5/2015 |
| RU | 2563063 C2 | 9/2015 |
| WO | WO-02/29269 A1 | 4/2002 |

OTHER PUBLICATIONS

Solken, Werner, Flanges General—Flange Types—Welding Neck or Weld Neck Flanges, Slip-On Flanges, Socket-Weld Flanges, Lap-Joint Flanges, Threaded Flanges and Blind Flanges,: Retrieved from the Internet on May 16, 2017: URL:http://web.archive.org/web/20160505042854/http://www.wermac.org/flanges/flanges_welding-neck_socket-weld_lap-joint_screwed_blind.html—p. 1, last sentence; p. 5, lines 1,2; figure 1.
International Search Report and Written Opinion for PCT/US2017/030798, dated Aug. 10, 2017.
Office Action for RU Application No. 2018140721/05 dated Jul. 22, 2020.
First Office Action for CN Application No. 201710324888.8 dated Aug. 31, 2020.
Communication Pursuant to Article 94(3) EPC for EP Application No. 17723840.9 dated Apr. 28, 2021.

* cited by examiner

PREDICTIVE ALGORITHM OF WELDING DISTORTION RESULTANT FROM ADDING FLANGES TO A BUTT WELD OR SOCKET WELD END OF VALVE BODY CASTING

FIELD OF THE DISCLOSURE

This disclosure relates generally to additive manufacturing, and, more particularly, to adding flanges to valve body ends using predictive algorithms of welding distortion.

BACKGROUND

The valve manufacturing industry consists of extremely high product variation and relatively low quantity of manufacture. One layer of complexity is due to the variety of inlet and outlet end connection configurations that are required by each customer. For example, a first customer may require a ring type joint flange configuration for the inlet and outlet end connections on each valve, while a second customer may require a socket weld configuration for the inlet and outlet end connections on each valve. Because the inlet and outlet end connections on each of the first customer's valves are physically different than the inlet and outlet end connections on each of the second customer's valves, only valves specifically manufactured for the first customer may be sold to the first customer, and only valves specifically manufactured for the second customer may be sold to the second customer. Accordingly, sales forecasting is relied upon to estimate the number of each of the first and second customer's valves that must be produced to meet the expected demand of that particular customer. If too many valves are manufactured for either customer, those excess valves waste production capacity to sit in inventory (and occupy valuable space) until a future order is placed. If too few valves are manufactured, a rush order may be required to meet a customer order. Because each valve body is typically sand casted at a remote foundry, the process of fabricating each valve body may take too long to meet such a short time frame, and delivery may be late. Accordingly, it would desirable to reduce inventory levels of customer-specific inlet and outlet end connection configurations, reduce reliance on sales forecasting on valves using such customer-specific end connection configurations, and decreasing production lead times for valves using such customer-specific end connection configurations.

BRIEF SUMMARY OF THE DISCLOSURE

A first exemplary aspect of the present disclosure includes a computer-implemented method for a late-customization of a valve body via an automated welding process, the method comprising: receiving a selection of a generic valve body having an initial first end configuration and an initial second end configuration; receiving a selection of a first end connection different than the initial first end configuration; receiving a selection of a second end connection different than the initial second end configuration; adjoining the selected first end connection to the valve body at the initial first end connection by: (i) performing an operation based on an initial bias, (ii) comparing the actual results of the operation to predicted results of the operation, (iii) adjusting the initial bias based on the comparison between the actual results and the predicted results, and (iv) repeating steps (i)-(iii) until the first end connection is satisfactorily adjoined to the valve body at the initial first end connection, steps (i)-(iv) defining an iterative welding process; and adjoining the selected second end connection to the valve body at the initial second end connection using the iterative welding process.

Another exemplary aspect of the current disclosure includes a computer-implemented method for a late-customization of a valve body via an automated welding process, the method comprising: receiving a selection of a generic valve body having an initial first end configuration and an initial second end configuration; receiving a selection of a first end connection different than the initial first end configuration; receiving a selection of a second end connection different than the initial second end configuration; adjoining the selected first end connection to the valve body at the initial first end connection using an iterative welding process; and adjoining the selected second end connection to the valve body at the initial second end connection using the iterative welding process.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Manufacturers may need to produce valves with a variety of inlet and outlet flange preparations, depending on the needs of the customers. However, the large number of flange combinations causes inventor management issues and other related problems. To alleviate this issue, it would be beneficial to reduce the stock to a small number of generic valve bodies that can later be customized to include the required end connections (via welding and/or other manufacturing techniques).

However, conventional welding processes can make such "late-customization" impractical. Even known automated welding processes can suffer from weld distortion. For example, depositing bolted flanges onto the outside diameter of a butt weld end casting may produce weldment cooling hoop stresses that can obstruct the inside diameter of the original valve outlet and inlet. Subsequent boring operations to restore the original flow diameters can result in wall thicknesses less than those minima specified by the ASME Boiler and Pressure Vessel Code or European Pressure Equipment Directive. Additional weld material deposited on the outside diameter of the inlet and outlet of the valve to restore wall thickness will create additional cooling hoop stress and recreate the original condition. Further, additional stresses caused during the welding process may distort the orthogonally of the flanges. Thus, to properly implement an automated welding system, the current disclosure relates to a predictive weld distortion algorithm to analyze and adjust the welding process. The predictive weld distortion algorithm would cure deficiencies caused by typical welding processes and make the use of generic valve bodies and late-customization possible.

A method of custom manufacturing a valve body 10 is provided, and the valve body 10 has an initial valve body configuration 12 (illustrated in FIG. 1) having a first end connection 14 and a second end connection 16. The first end connection 14 has an initial first end configuration 18 and the second end connection 16 has an initial second end configuration 20. The method includes adding material to the first end connection 14 using a first additive manufacturing process (for example, a directed energy laser deposition process or a three-dimensional printing process) to create at least a portion of a custom first end connection configuration 22 (as illustrated in FIG. 2), and the custom first end connection configuration 22 is different than the initial first end configuration 18. The method also includes adding material to the second end connection 16 using a second additive manufacturing process (for example, a directed energy laser deposition process or a three-dimensional printing process) to create at least a portion of a custom second end connection configuration 24 (as illustrated in FIG. 2), and the custom second end connection configuration 24 is different than the initial second end configuration 20.

So configured, a plurality of "generic" valve bodies 10 (identical to that illustrated in FIG. 1) having identical initial first end configurations 18 and initial second end configurations 20 can be "late customized" based on customer-specific end configurations requirements. Although one "generic" valve body 10 is illustrated throughout, there may be one or more permutations of the "generic" valve body which can be further altered via the late customization methods discussed herein.

By use of an additive manufacturing processes, a first valve body 10 may have the initial first end configurations 18 (for example, a butt weld configuration) modified to a custom first end connection configuration 22 (for example, a first flange configuration having a first diameter and a first thickness), such as that illustrated in FIG. 2. In addition, by using the same (or a different) additive manufacturing processes, a second valve body 10 may have the initial first end configurations 18 (for example, the butt weld configuration of the first valve body 10a) modified to a different custom first end connection configuration 22 (for example, a second flange configuration having a second diameter and a second thickness), such as that illustrated in FIG. 3. Similarly, the custom second end connection configurations 24 for each of the first and second valve bodies 10 can be created from the initial second end configuration 20 on a generic valve body 10. Accordingly, instead of casting two complete and finished valve bodies for each custom first end connection configuration 22 of the first and second valve bodies, the generic valve bodies 10 can be modified quickly and on a per-order basis into a desired custom first end connection configuration 22. Thus, maintaining an accurate inventory of finished valve bodies having a corresponding custom first end connection configurations 22 (and/or custom second end connection configurations 24) is no longer necessary, as custom requirements can be created on an as-needed basis from the generic valve bodies 10.

Figure 1:
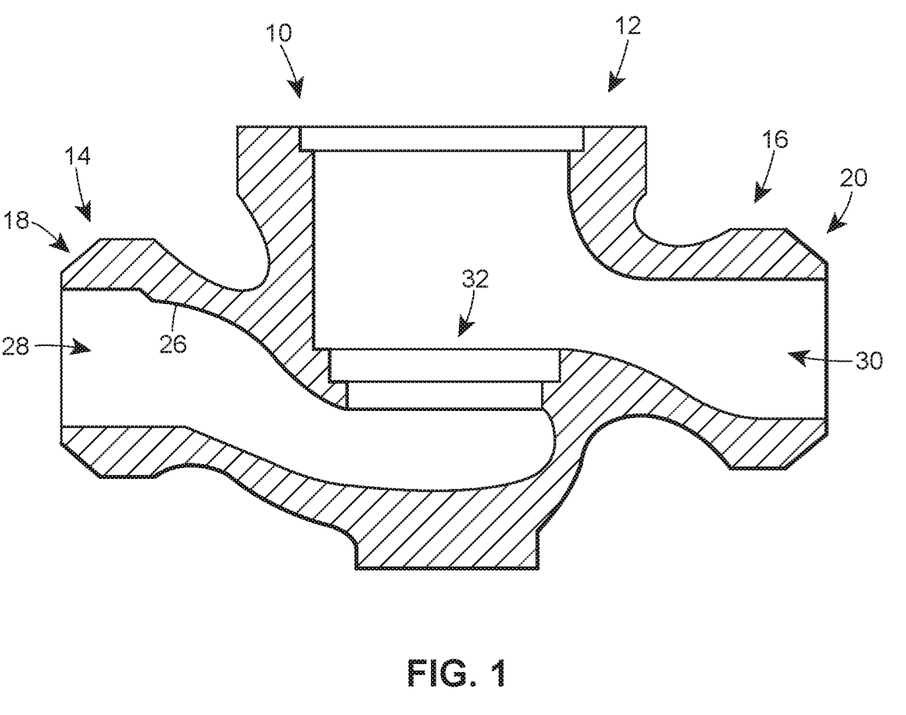
FIG. 1 is a sectional side view of an embodiment of a valve body having an initial valve body configuration with a first end connection having an initial first end configuration and a second end connection having an initial second end configuration.
Figure 2:
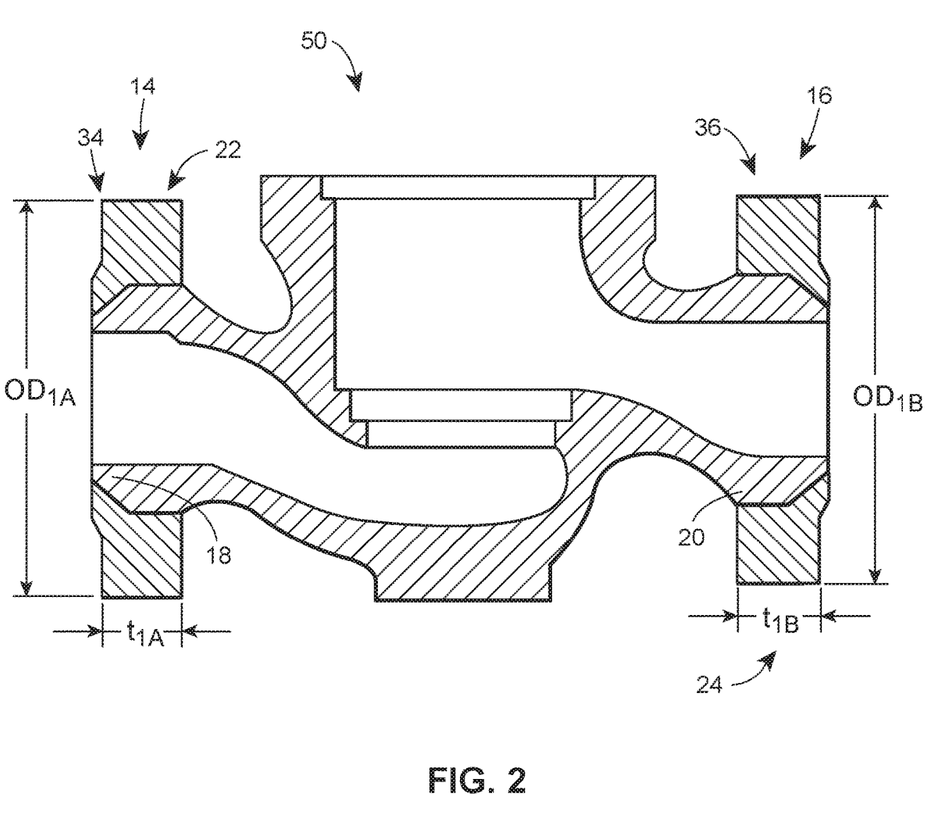
FIG. 2 is a sectional side view of another embodiment of a valve body having a first end connection having a custom first end connection configuration and a second end connection having a custom second end connection configuration.

Turning to the method in more detail, FIG. 1 illustrates the initial valve body configuration 12 of the valve body 10 that includes the first end connection 14 and the second end connection 16. The first end connection 14 may be an inlet end connection and the second end connection 16 may be an outlet end connection. However, the first end connection 14 may be an outlet end connection and the second end connection 16 may be an inlet end connection. In some embodiments, the initial valve body configuration 12 of the valve body 10 may also have a third end connection (not shown) or additional end connections. The valve body 10 may have a plurality of interior surfaces 26 that cooperate to define an inlet 28, and outlet 30, and a valve seat 32 disposed between the inlet 28 and the outlet 30. The valve seat 32 may be adapted to be selectively engaged by a valve plug (not shown) that moves in a known manner between a closed position (in which the valve plug sealingly engages the valve seat 32) and an open position (in which the valve plug does not sealingly engage the valve seat 32).

The first end connection 14 has an initial first end configuration 18 and the second end connection 16 has an initial second end configuration 20. Each of the initial first end configuration 18 and the initial second end configuration 20 may be any end configuration that can be later modified to a suitable custom first end connection configuration 22 and a custom second end connection configuration 24, respectively. For example, as illustrated in FIG. 1, one or both of the initial first end configuration 18 and the initial second end configuration 20 may be a butt weld end connection or may be an endless end configuration. However, any suitable end connection is contemplated, including screwed ends, socket weld ends, raised face and ring type joint flanges, and Graloc® hubs, for example. The initial valve body configuration 12 of the valve body 10 may be made, fabricated, and/or manufactured by any suitable method, such as by casting (e.g., sand casting) the initial valve body configuration 12 of the valve body 10. The initial valve body configuration 12 of the valve body 10 may be made, fabricated, and/or manufactured at any suitable location, and the location may not be in the same facility in which the first additive manufacturing process and/or first additive manufacturing process occurs. The initial valve body configuration 12 of the valve body 10 may be made, fabricated, and/or manufactured from any suitable material or combination of materials. For example, the initial valve body configuration 12 of the valve body 10 may be made, fabricated, and/or manufactured from a first material, which may be a metal, such as a steel material (e.g., carbon steel).

A custom modification may be made to the initial valve body configuration 12 of the valve body 10 for any suitable reason. For example, a first customer may have a first set of requirements for a configuration of the first end connection 14 and the second end connection 16 that require a modification to the initial first end configuration 18 and the initial second end configuration 20. Accordingly, the initial first end configuration 18 may be modified by a first additive manufacturing process to create at least a portion of the custom first end connection configuration 22 of the valve body 50 of FIG. 2 and the initial second end configuration 20 may be modified by a second additive manufacturing process to create at least a portion of the custom second end connection configuration 24 of the valve body 50 of FIG. 2. The custom first end connection configuration 22 may be different than the initial first end configuration 18, and the custom second end connection configuration 24 may be different than the initial second end configuration 20.

The first additive manufacturing process may be the same as the second additive manufacturing process. However, in some embodiments, the first additive manufacturing process may be different than the second additive manufacturing process. The first additive manufacturing process may be any additive manufacturing process or technology that builds three-dimensional objects by adding successive layers of material on a material. The first additive manufacturing process (and/or the second additive manufacturing process) may be performed by any suitable machine or combination of machines. The first additive manufacturing process may typically involve or use a computer, three-dimensional modeling software (e.g., Computer Aided Design, or CAD, software), machine equipment, and layering material. Once a CAD model is produced, the machine equipment may read in data from the CAD file and layer or adds successive layers of liquid, powder, sheet material (for example) in a layer-upon-layer fashion to fabricate a three-dimensional object. The first additive manufacturing process (and/or the second additive manufacturing process) may include any of several processes, such as example only, a stereolithography ("SLA") process, a fused deposition modeling ("FDM") process, multi-jet modeling ("MJM") process, and a selective laser sintering ("SLS") process. In some embodiments, the first additive manufacturing process (and/or the second additive manufacturing process) may include a directed energy laser deposition process. Such a directed energy laser deposition process may be performed by a multi-axis computer-numerically-controlled ("CNC") lathe with directed energy laser deposition capabilities.

As previously explained, material may be added to the first end connection 14 of the valve body 10 using the first additive manufacturing process to create at least a portion of the custom first end connection configuration 22 of the embodiment of the valve body 50 illustrated in FIG. 2. The material added may be the same material as the material used to make, fabricate, and/or manufacture the valve body 10 (e.g. the material may be the first material). However, the material added may be a different material than the material used to make, fabricate, and/or manufacture the valve body 10 (e.g. the material may be a second material that is different than the first material).

In some embodiments, as illustrated in FIG. 1, the initial first end configuration 18 may be a butt-weld connection that may be suitable for butt-welding to a corresponding butt-weld connection on an adjacent end of a downstream inlet pipe. However, a customer may require a custom first end connection configuration 22 that is a flange configuration having a particular thickness and outer diameter, and therefore the valve body 10 having the initial valve body configuration 12 may be machined or processed (using the first additive manufacturing process) to add material to the initial first end configuration 18 to create at least a portion of the custom first end connection configuration 22 of the valve body 50, which may be a first end flange 34 having a thickness t1A and an outside diameter OD1A. The custom first end connection configuration 22 of the valve body 50 may be any suitable end connection that is different than the initial first end configuration 18, and any suitable end connection is contemplated, such as screwed ends, socket weld ends, raised face and ring type joint flanges, and Graloc® hubs, for example.

The creation, manufacturing, or fabrication of the custom first end connection configuration 22 may also require removing material from the first end connection 14 (for example, in the initial first end configuration 18) using a first material removal process to create at least a portion of the custom first end connection configuration 22. The first material removal process may be performed by any suitable machine or combination of machines, and the first material removal process may be performed prior to, after, or during the first additive manufacturing process. For example, the first material removal process may be a cutting process performed by a lathe and/or a drilling process performed by a drill. In some embodiments, the first material removal process may be performed by the same equipment (e.g., machine or combination of machines) that performs the first additive manufacturing process. For example, the first material removal process may be performed by the multi-axis computer-numerically-controlled ("CNC") lathe with directed energy laser deposition capabilities.

In some embodiments, as illustrated in FIG. 1, the initial second end configuration 20 may be identical to the initial first end configuration 18, and the initial second end configuration 20 may also be a butt-weld connection. Accordingly, the customer may require a custom second end connection configuration 24 of the valve body 50 that may be identical to the custom first end connection configuration 22, and the custom second end connection configuration 24 may be a second end flange 36 having a thickness t1B and an outside diameter OD1B, and the thickness t1B and an outside diameter OD1B may be identical to the thickness t1A and an outside diameter OD1A of the first end flange 34. However the custom second end connection configuration 24 may be any suitable end connection that is different than the initial second end configuration 20, and any suitable end connection is contemplated, such as screwed ends, socket weld ends, raised face and ring type joint flanges, and Graloc® hubs, for example.

Therefore, the valve body 10 having the initial valve body configuration 12 may be machined or processed (using the second additive manufacturing process) to add material to the initial second end configuration 20 to create at least a portion of the custom second end connection configuration 24 of the valve body embodiment 50. The second additive manufacturing process may be the same as the first additive manufacturing process discussed in reference to the creation of at least a portion of the custom first end connection configuration 22. The material added may be the same material as the material used to make, fabricate, and/or manufacture the valve body 10 (e.g., the material may be the first material) and or the same material added to the first end connection 14 of the valve body 10 using the first additive manufacturing process. However, the material added during the second additive manufacturing process may be different than the first material and the material added during the first additive manufacturing process (e.g. the material may be a third material that is different than the first material and the second material). In other embodiments, the material added during the second additive manufacturing process may be different than the first material and but the same as the material added during the first additive manufacturing process (e.g. the material may be the second material).

The creation, manufacturing, or fabrication of the custom second end connection configuration 24 of the valve body 50 may also require removing material from the second end connection 16 (for example, in the initial second end configuration 20) using a second material removal process to create at least a portion of the custom second end connection configuration 24. The second material removal process may be performed by any suitable machine or combination of machines, and the second material removal process may be similar to the first material removal process described in the discussion of the custom first end connection configuration 22. Specifically, the second material removal process may be performed prior to, after, or during the second additive manufacturing process, and the second material removal process may be a cutting process performed by a lathe and/or a drilling process performed by a drill. In some embodiments, the second material removal process may be performed by the same equipment (e.g., machine or combination of machines) that performs the first additive manufacturing process, and/or the second additive manufacturing process, and/or the first material removal process. For example, the second material removal process may be performed by the multi-axis computer-numerically-controlled ("CNC") lathe with directed energy laser deposition capabilities.

As previously explained, the initial valve body configuration 12 of the valve body 10 may be "generic" to at least two different end configurations. Therefore, the initial valve body configuration 12 of a different valve body 100 (see FIG. 3) may be modified to a different set of customer requirements in the manner previously described (e.g., may be modified differently than the embodiment of the valve body 50 of FIG. 2). That is, the initial first end configuration 18 of the valve body 10 may be modified by the first additive manufacturing process that was previously described to create at least a portion of the custom first end connection configuration 22 of the valve body 100 and the initial second end configuration 20 of the valve body 100 may be modified by a second additive manufacturing process to create at least a portion of the custom second end connection configuration 24 of the valve body 100.

Figure 3:
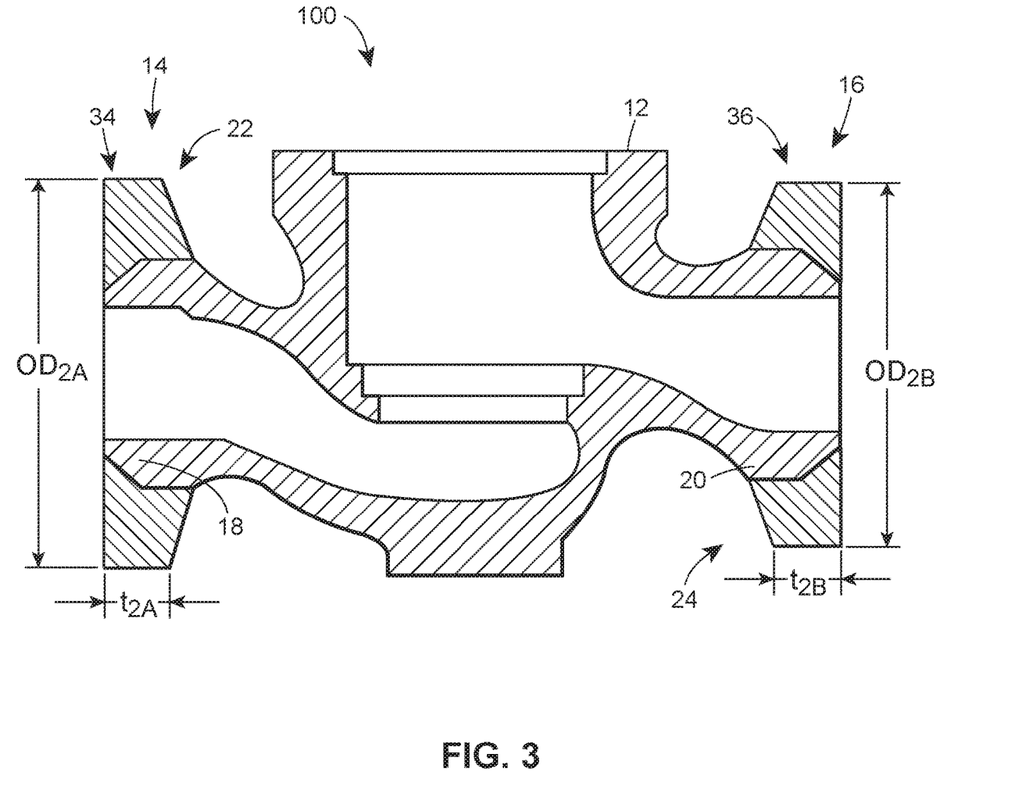
FIG. 3 is a sectional side view of an additional embodiment of a valve body having a first end connection having a custom first end connection configuration and a second end connection having a custom second end connection configuration.

The custom first end connection configuration 22 of the valve body 100 may be different than the custom first end connection configuration 22 of the valve body 50 (illustrated in FIG. 2) and the custom second end connection configuration 24 of the valve body 100 may be different than the custom second end connection configuration 24 of the valve body 50 (illustrated in FIG. 2). For example, as illustrated in FIG. 3, the custom first end connection configuration 22 of the valve body 100 may have a particular thickness and outer diameter, and material may be added or removed as described above to create at least a portion of the custom first end connection configuration 22 of the valve body 100, which may be a first end flange 34 having a thickness t2A and an outside diameter OD2A.

In addition, the custom second end connection configuration 24 of the valve body 100 may have a particular thickness and outer diameter, and material may be added or removed as described above to create at least a portion of the custom second end connection configuration 24 of the valve body 100, which may be a second end flange 36 having a thickness t2B and an outside diameter OD2B. The thickness t2B and an outside diameter OD2B may be identical to the thickness t2A and an outside diameter OD2A of the first end flange 34 of the valve body 100. However, any or all of the thicknesses t2A and t2B and/or the outside diameters OD2A, OD2B of the valve body 100 (of FIG. 3) may be different than any or all of the corresponding thicknesses t2A and t2B and/or the corresponding outside diameters OD2A, OD2B of the valve body 50 (of FIG. 2). The first material, second material, and/or the third material used on the custom first end connection configuration 22 and/or the custom second end connection configuration 24 of the valve body 100 of FIG. 3 may be the same as (or any or all may different than) the first material, second material, and/or the third material used on the custom first end connection configuration 22 and/or the custom second end connection configuration 24 of the valve body 50 of FIG. 2.

Any number of custom first and second end configurations are possible using the "generic" valve body 10 having the initial valve body configuration 12 illustrated in FIG. 1. For example, a plurality of "generic" valve bodies 10 having the initial valve body configuration 12 (and the initial first end configuration 18 and the initial second end configuration 20) may be ordered from a supplier and stored in an appropriate storage location. When a customer-specific valve is ordered by a first customer, a "generic" valve body 10 is transferred from the storage location to a first manufacturing position. At the first manufacturing position, the initial valve body configuration 12 may be machined or processed (using the first additive manufacturing process) to add material to the initial first end configuration 18 to create at least a portion of the custom first end configuration 22 of the first customer, as previously described (e.g., as illustrated in FIG. 2). Also at the first manufacturing position, the initial valve body configuration 12 may be machined or processed (using the second additive manufacturing process) to add material to the initial second end configuration 20 to create at least a portion of the custom second end connection configuration 24 of the first customer, as previously described (e.g., as illustrated in FIG. 2). The customer-specific valve body 50 (of FIG. 2) is then ready to be shipped to the first customer.

When a customer-specific valve is ordered by a second customer, another "generic" valve body 10 is transferred from the appropriate storage location to the first (of a second) manufacturing position. At the first (or second) manufacturing position, the initial valve body configuration 12 of the valve body 10 may be machined or processed (using the first additive manufacturing process) to add material to the initial first end configuration 18 to create at least a portion of the custom first end connection configuration 22 of the second customer, as previously described (e.g., as illustrated in FIG. 3). Also at the first (or second) manufacturing position, the initial valve body configuration 12 may be machined or processed (using the second additive manufacturing process) to add material to the initial second end configuration 20 to create at least a portion of the custom second end connection configuration 24 of the second customer, as previously described (e.g., as illustrated in FIG. 3). The customer-specific valve body 100 (of FIG. 3) is then ready to be shipped to the second customer. One having ordinary skill in the art would recognize that storing the plurality of "generic" valve bodies 10 and using "late customization" to make customer-specific modifications on a per-order basis reduces the reliance on sales forecasts and also requires less lead times to execute orders.

Figure 4:
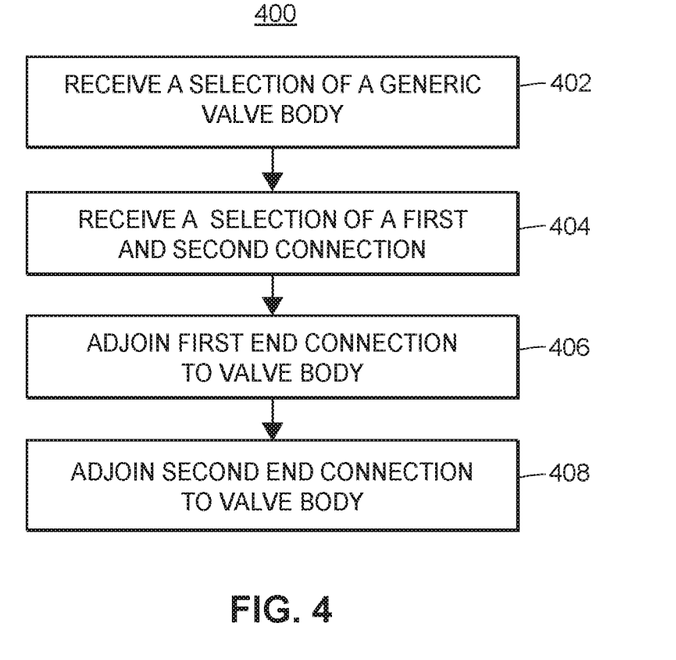
FIG. 4 is a flowchart illustrating an exemplary method for using a predictive weld distortion algorithm to adjoin first and second end connections to a valve body.

Now referring to FIG. 4, a computer-implemented system may be employed in a method 400 to add custom end connections to a generic valve body. The method 400 may be implemented using one or more functions and/or routines in the form of non-transitory computer-executable instructions that are stored in a tangible computer-readable storage medium and/or executed using a processor of a computing device. The routines may be implemented in automated and controlled weld equipment, such as directed energy laser deposition, 3-D printing, etc.

The method 400 may being after the system receives a selection of a generic valve body (Block 402). As described above, the generic valve body may include one or more initial end configurations that are intended to be customized by the methods disclosed herein. The selected valve may correspond to valve body 10 with valve body configuration 12 as discussed with reference to FIGS. 1-3. For example, the selected valve may be a flanged valve, a globe valve and/or a rotary valve. The above examples are not intended to be limiting and the generic vale body may be of any suitable size, shape and/or configuration to be used in the method of the current disclosure. Further, the initial end configurations of the selected generic valve body may also be of any suitable size, shape and/or configuration to be used in the method of the current disclosure.

Next, the system may receive a selection of a first and second end connections (Block 404). For example, the first and second end connections may be any suitable combination of screwed ends, socket weld ends, raised face and ring type joint flanges, and Graloc® hubs. In one embodiment, the first and second end connections will be the same, while in other embodiments the first and second end connections are different. The use of first and second end connections is not intended to be limiting and the system may receive a selection of any number of end connections corresponding to the number of initial end configurations included in the selected generic valve body.

Further, for the system may also receive a selection of one or more attributes such as a material, a size, a shape, an inner diameter, an outer diameter, etc. corresponding to each received end connection. As discussed above, the first and second received end connections may be identical or vary based on the selectable attributes.

The system may then begin to adjoin the first end connection to the valve body (Block 406). In an embodiment, the system may implement a five axis, computer numerically controlled (CNC) lathes with directed energy laser deposition capabilities to adjoin the first end connection to the valve body using both additive and subtractive manufacturing processes. In another embodiment, the system may implement a 3-D printer or other similar automated manufacturing device to weld and/or adjoin the first end connection to the valve body. In an embodiment, the first end connection may be welded to the valve body prior to finish machining and assembly. In another embodiment, the valve body may already be cast polished/finished before the system adjoins the first end connection.

In an embodiment, the system implements a predictive weld distortion algorithm to iteratively adjust and/or continuously offset the automated welding machine through each sequential pass and/or operation. The system may begin by adjoining the first end connection to the valve body (at the corresponding initial end connection) via an operation based on an initial bias corresponding to properties of the valve body and selected first end connection. The initial bias may be empirically developed through experimental data based on the selected generic valve body, the selected first end connection, and one or more of (i) coefficients of thermal expansion of cast and/or forged base material and/or weld material, (ii) yield strength of cast and/or forged base material and/or weld material, (iii) original wall thickness of the initial end connection, (iv) desired final first end connection outside diameter, (v) desired final first end connection thickness (vi) welding heat input rate and interpass temperature, (vii) deposition rate of weld metal, and/or (viii) welding position (vertical, horizontal, etc.).

After the operation based on the initial bias, the system may analyze the actual physical results of the first operation to determine if the initial bias should be adjusted. For example, the system may compare predicted results of the operation to one or more measurements of actual results such as temperature, weight, displacement of the first end connection and/or any other factor that may indicate the result of the first operation. If the predicted results vary from the actual results, the system may adjust the bias and consequently the operation.

The system may perform any number of functions through each operation. For example, the system may weld, bore, cut, sand, knurl, drill, turn and/or perform any other necessary function to adjoin the first end connection to the valve body. Any combination of functions may be performed through each operation, wherein the combination of functions is based, at least in part, on the determined bias.

The above loop (operation→compare results→adjust bias) will continue until the first end connection is satisfactorily adjoined to the valve body at the initial end connection. In other words, the system may continue to weld, bore, cut, sand, knurl, drill, turn and/or otherwise operate to adjoin the first end connection to the valve body until the connection meets a set of requirements. For example, the system may require a desired inner diameter, a desired outer diameter, a desired configuration (e.g. the first end connection must be orthogonal to the intlet/outlet defined by the valve body), etc.

Once the first end connection is satisfactorily adjoined to the valve body, the system may then begin to adjoin the second end connection to the valve body (Block 406). In an embodiment, the system may implement a five axis, computer numerically controlled (CNC) lathes with directed energy laser deposition capabilities to weld the second end connection to the valve body using both additive and subtractive manufacturing processes. In another embodiment, the system may implement a 3-D printer or other similar automated manufacturing device to weld and/or adjoin the second end connection to the valve body. In an embodiment, the second end connection may be welded to the valve body prior to finish machining and assembly. In another embodiment, the valve body may already be cast and polished before the system adjoins the second end connection.

In an embodiment, the system implements a predictive weld distortion algorithm to iteratively adjust and/or continuously offset the automated welding machine through each sequential pass and/or operation. The system may begin by adjoining the second end connection to the valve body (at the corresponding initial end connection) via an operation based on an initial bias corresponding to properties of the valve body and selected second end connection. The initial bias may empirically developed through experimental data based the selected generic valve body, the selected first end connection, and on one or more of (i) coefficients of thermal expansion of cast and/or forged base material and/or weld material, (ii) yield strength of cast and/or forged base material and/or weld material, (iii) original wall thickness of the initial end connection, (iv) desired final first end connection outside diameter, (v) desired final first end connection thickness (vi) welding heat input rate and interpass temperature, (vii) deposition rate of weld metal, and/or (viii) welding position (vertical, horizontal, etc.).

After the operation based on the initial bias, the system may analyze the actual physical results of the first operation to determine if the initial bias should be adjusted. For example, the system may compare predicted results of the operation to one or more measurements of actual results such as temperature, weight, displacement of the first end connection and/or any other factor that may indicate the result of the first operation. If the predicted results vary from the actual results, the system may adjust the bias and consequently the operation.

The system may perform any number of functions through each operation. For example, the system may weld, bore, cut, sand, knurl, drill, turn and/or perform any other necessary function to adjoin the second end connection to the valve body. Any combination of functions may be performed on through each operation, wherein the combination of functions is based, at least in part, on the determined bias.

The above loop (operation→compare results→adjust bias) will continue until the second end connection is satisfactorily adjoined to the valve body at the corresponding initial end connection. In other words, the system may continue to weld, bore, cut, sand, knurl, drill, turn and/or otherwise operate to adjoin the second end connection to the valve body until the connection meets a set of requirements. For example, the system may require a desired inner diameter, a desired outer diameter, a desired configuration (e.g. the second end connection must be orthogonal to the intlet/outlet defined by the valve body), etc.

Accordingly, the method 400 provides for late customization of generic flange configurations of a plurality of generic valve bodies to a desired (customer-specific) flange configuration directly on the generic valve body by use of additive manufacturing techniques, such as directed energy laser deposition. Consequently, a large volume of generic valve body castings can be created and subsequently customized with desired flange or end configurations as required, thereby reducing inventory levels of customer-specific flange configurations, reducing reliance on sales forecasting, and decreasing production lead times.

While various embodiments have been described above, this disclosure is not intended to be limited thereto. Variations can be made to the disclosed embodiments that are still within the scope of the appended claims.

What is claimed:

1. A computer-implemented method for a late-customization of a valve body via an automated welding process, the method comprising:
   receiving a selection of a generic valve body having an initial first end configuration and an initial second end configuration;
   receiving a selection of a first end connection different than the initial first end configuration;
   receiving a selection of a second end connection different than the initial second end configuration;
   implementing an automated iterative welding process using a predictive weld distortion algorithm, configured to provide predicted results for the automated iterative welding process, to adjoin the selected first end connection to the valve body at an initial first end connection, including:
   (i) performing an operation from the set of operations based on an initial bias, to adjoin the selected first end connection to the valve body at the initial first end connection,
   (ii) analyzing a physical result of the operation to determine an actual result,
   (iii) comparing the actual result of the operation to a predicted result of the operation, predicted based on one or more properties of the valve body or the selected first end connection, to determine if the initial bias should be adjusted,
   (iv) adjusting the initial bias to account for a variation based on the comparison between the actual result and the predicted result, and
   (v) repeating steps (i)-(iv) for one or more passes until the selected first end connection is satisfactorily adjoined to the valve body at the initial first end connection; and
   implementing an automated iterative welding process using a predictive weld distortion algorithm, configured to provide predicted results for the automated iterative welding process, to adjoin the selected second end connection to the valve body at an initial second end connection.

2. The computer-implemented method of claim 1, wherein the operation is performed by a directed energy laser deposition process.

3. The computer-implemented method of claim 1, wherein the operation is performed by a 3-D printer.

4. The computer-implemented method of claim 1, wherein the set of operations comprises one or more of a weld function, a bore function, a cut function, a sand function, a knurl function, a drill function, or a turn function.

5. The computer implemented method of claim 4, wherein adjusting the initial bias further comprises:
   changing to a new operation from the set of operations.

6. The computer-implemented method of claim 1, wherein at least one of the initial first end configuration or the initial second end configuration is a butt weld end connection.

7. The computer-implemented method of claim 1, wherein at least one of the initial first end configuration or the initial second end configuration is a flange configuration.

8. The computer-implemented method of claim 1, wherein the initial bias is based on the selected generic valve body, the selected first end connection or the selected second end connection, and one or more of (i) a coefficient of thermal expansion of a cast and/or a forged base material and/or a weld material, (ii) a yield strength of the cast and/or the forged base material and/or weld material, (iii) an original wall thickness of the first or second initial end connection, (iv) a desired final first or second end connection outside diameter, (v) a desired final first or second end connection thickness (vi) a welding heat input rate and interpass temperature, (vii) a deposition rate of a weld metal, or (viii) a welding position (vertical, horizontal, etc.).

9. The computer-implemented method of claim 1, wherein the initial first end connection is an inlet end connection and the initial second end connection is an outlet end connection.

10. The computer-implemented method of claim 1, wherein the generic valve body is one of a flanged valve, a globe valve or a rotary valve.

11. The computer-implemented method of claim 1, wherein the selected first end connection is one of a screwed end, a socket weld end, a raised face and ring type joint flange, or a Graloc® hub.

12. The computer-implemented method of claim 1, wherein the selected second end connection is one of a screwed end, a socket weld end, a raised face and ring type joint flange, or a Graloc® hub.

13. The computer-implemented method of claim 1, wherein the selected first end connection and the selected second end connection are the same.

14. An apparatus for late-customization of a valve body via an automated welding process comprising:
one or more processors; and
machine equipment capable of three dimensional additive manufacturing, the machine equipment configured to:
receive a generic valve body having an initial first end configuration and an initial second end configuration;
receive a selection of a first end connection different than the initial first end configuration;
receive a selection of a second end connection different than the initial second end configuration;
implement an automated iterative welding process using a predictive weld distortion algorithm, configured to provide predicted results for the automated iterative welding process, to adjoin the selected first end connection to the valve body at an initial first end connection by:
(i) performing an operation based on an initial bias to adjoin the selected first end connection to the valve body at the initial first end connection,
(ii) analyzing a physical result of the operation to determine an actual result,
(iii) comparing the actual result of the operation to a predicted result of the operation, predicted based on one or more properties of the valve body or the selected first end connection, to determine if the initial bias should be adjusted,
(iv) adjusting the initial bias to account for a variation based on the comparison between the actual result and the predicted result, and
(v) repeating steps (i)-(iv) for one or more passes until the selected first end connection is satisfactorily adjoined to the valve body at the initial first end connection; and
implement an automated iterative welding process using a predictive weld distortion algorithm, configured to provide predicted results for the automated iterative welding process, to adjoin the selected second end connection to the valve body at an initial second end connection.

15. The apparatus of claim 14, wherein the machine equipment is further configured to:
perform one or more of a the following as the operation: a weld function, a bore function, a cut function, a sand function, a knurl function, a drill function, or a turn function.

16. A system for late-customization of a valve body via an automated welding process, the system including:
one or more processors; and
machine equipment capable of three dimensional additive manufacturing, the machine equipment configured to:
receive a generic valve body having an initial first end configuration and an initial second end configuration;
receive a selection of a first end connection different than the initial first end configuration;
receive a selection of a second end connection different than the initial second end configuration;
implement an automated iterative welding process using a predictive weld distortion algorithm, configured to provide predicted results for the automated iterative welding process, to adjoin the selected first end connection to the generic valve body at an initial first end connection by:
(i) performing an operation based on an initial bias to adjoin the selected first end connection to the generic valve body at the initial first end connection,
(ii) analyzing a physical result of the operation to determine an actual result,
(iii) comparing the actual result of the operation to a predicted result of the operation, predicted based on one or more properties of the generic valve body or the selected first end connection, to determine if the initial bias should be adjusted, wherein comparing the actual result to the predicted result includes comparing one or more measurements of: a temperature, a displacement of the selected first end connection, or a weight, from the actual result against the predicted result,
(iv) adjusting the initial bias to account for a variation based on the comparison between the actual result and the predicted result, and
(v) repeating steps (i)-(iv) for one or more passes until the first end connection is satisfactorily adjoined to the generic valve body at the initial first end connection; and
implement an automated iterative welding process using a predictive weld distortion algorithm, configured to provide predicted results for the automated iterative welding process, to adjoin the selected second end connection to the generic valve body at an initial second end connection.

17. The system of claim 16, wherein the machine equipment is a 3-D printer.

18. The system of claim 16, wherein the machine equipment is further configured to:
perform one or more of a the following as the operation: a weld function, a bore function, a cut function, a sand function, a knurl function, a drill function, or a turn function.

19. The system of claim 16, wherein the initial bias is based on the selected generic valve body, the selected first end connection or the selected second end connection, and one or more of (i) a coefficient of thermal expansion of a cast and/or a forged base material and/or a weld material, (ii) a yield strength of the cast and/or the forged base material and/or weld material, (iii) an original wall thickness of the first or second initial end connection, (iv) a desired final first or second end connection outside diameter, (v) a desired final first or second end connection thickness (vi) a welding heat input rate and interpass temperature, (vii) a deposition rate of a weld metal, or (viii) a welding position.

20. The system of claim 16, wherein the generic valve body is one of a flanged valve, a globe valve or a rotary valve.

\* \* \* \* \*

UNITED STATES PATENT AND TRADEMARK OFFICE
CERTIFICATE OF CORRECTION

PATENT NO. : 11,253,941 B2
APPLICATION NO. : 15/585978
DATED : February 22, 2022
INVENTOR(S) : Ted D. Grabau It is certified that error appears in the above-identified patent and that said Letters Patent is hereby corrected as shown below:

On the Title Page

At Column 2, item (56), under "OTHER PUBLICATIONS", Line 6, "16,48" should be -- 16, 48 --.

At Column 2, item (56), under "OTHER PUBLICATIONS", Line 1, "Flanges" should be -- "Flanges --.

At Column 2, item (56), under "OTHER PUBLICATIONS", Line 3, "Flanges,:" should be -- Flanges": --.

In the Specification

At Column 3, Line 65, "first valve body 10$a$" should be -- first valve body 10 --.

At Column 4, Line 48, "Graloc®" should be -- Grayloc® --.

At Column 5, Line 30, "read in" should be -- read --.

At Column 6, Line 9, "Graloc®" should be -- Grayloc® --.

At Column 6, Line 46, "Graloc®" should be -- Grayloc® --.

At Column 6, Line 59, "and or" should be -- and/or --.

At Column 7, Line 1, "and but" should be -- but --.

At Column 9, Line 26, "Graloc®" should be -- Grayloc® --.

At Column 10, Line 33, "intlet/outlet" should be -- inlet/outlet --.

Signed and Sealed this
Twenty-eighth Day of February, 2023

Katherine Kelly Vidal
*Director of the United States Patent and Trademark Office*

CERTIFICATE OF CORRECTION (continued)
U.S. Pat. No. 11,253,941 B2

At Column 10, Line 59, "may" should be -- may be --.

At Column 10, Line 60, "the" should be -- on the --.

At Column 11, Line 32, "intlet/" should be -- inlet/ --.

At Column 12, Line 1, "operations" should be -- operations, --.

At Column 12, Line 34, "computer implemented" should be -- computer-implemented --.

At Column 12, Line 54, "thickness" should be -- thickness, --.

At Column 12, Line 67, "Graloc®" should be -- Grayloc® --.

At Column 13, Line 4, "Graloc®" should be -- Grayloc® --.

At Column 13, Line 51, "a the" should be -- the --.

At Column 14, Line 41, "a the" should be -- the --.

At Column 14, Line 54, "thickness" should be -- thickness, --.